UNITED STATES PATENT OFFICE.

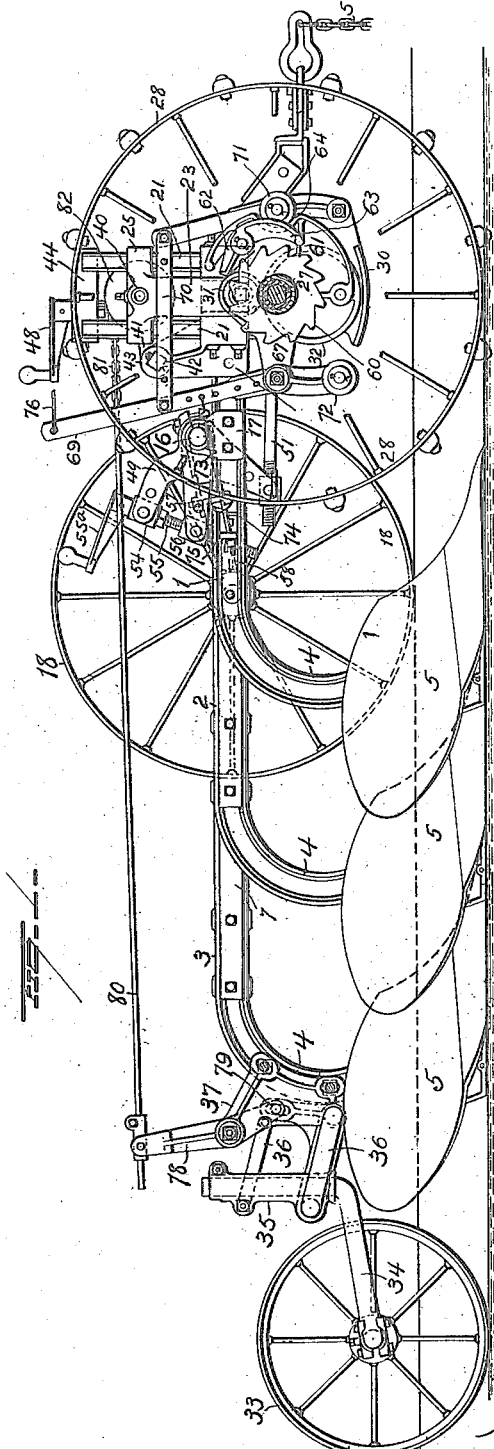

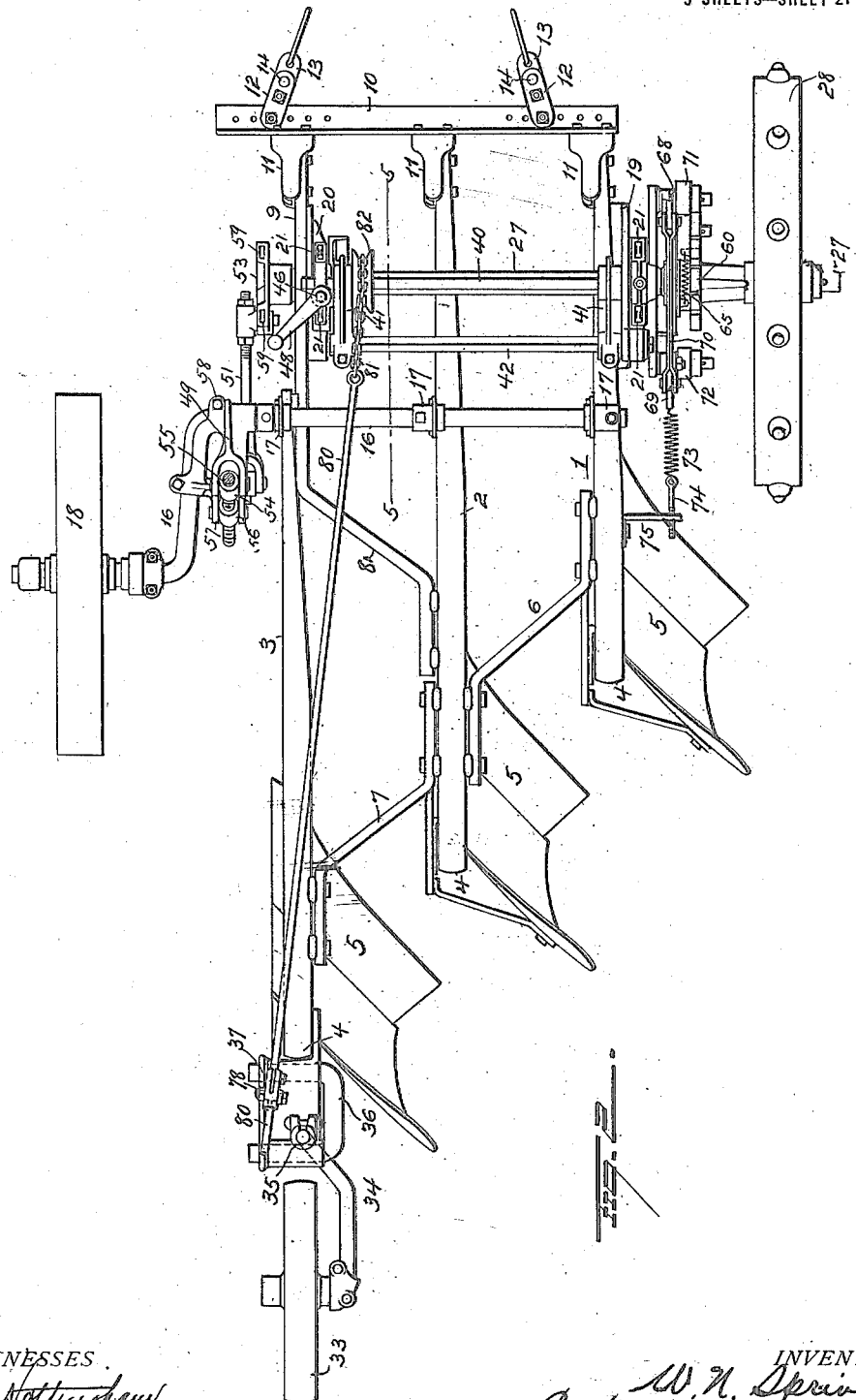

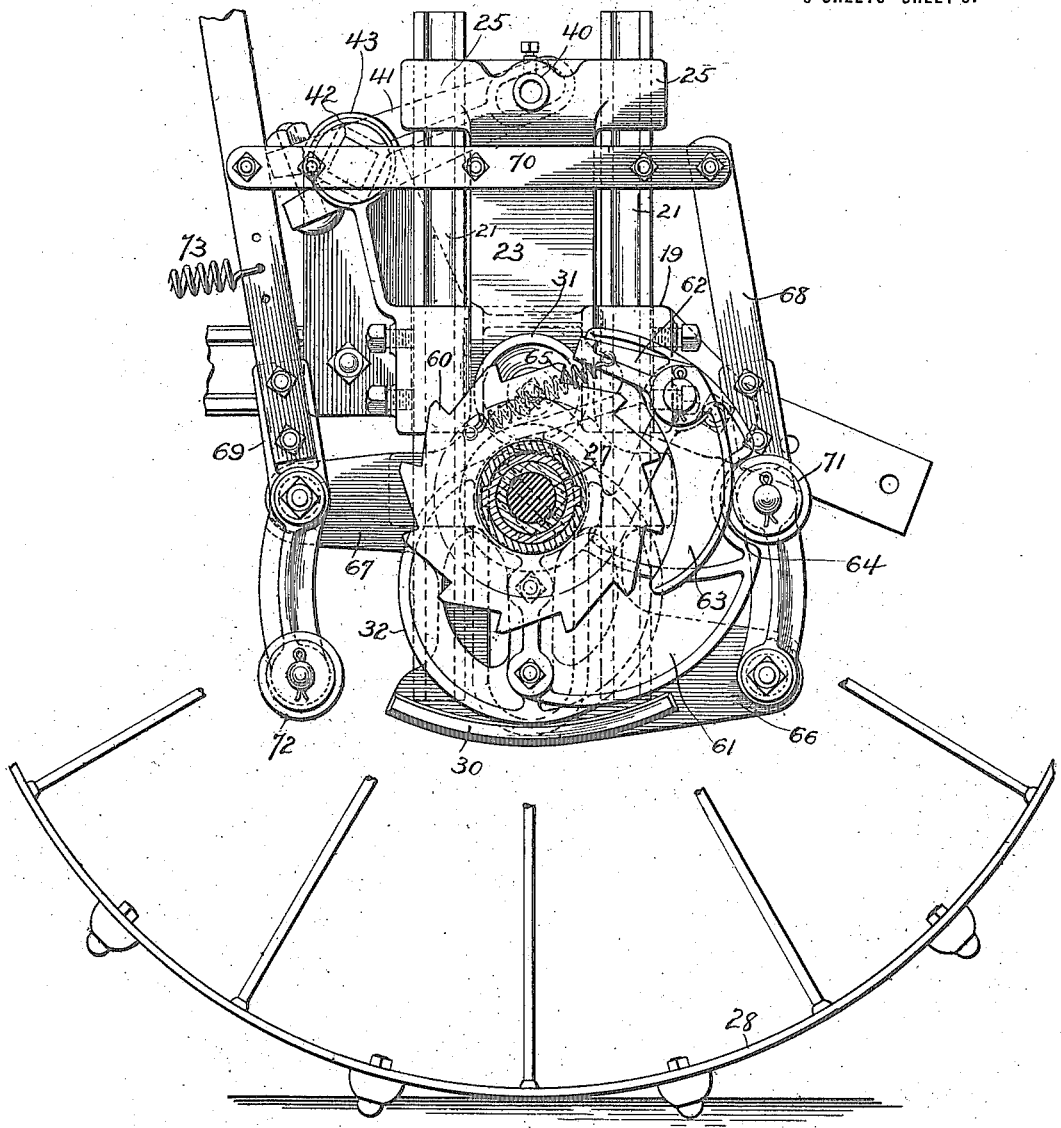

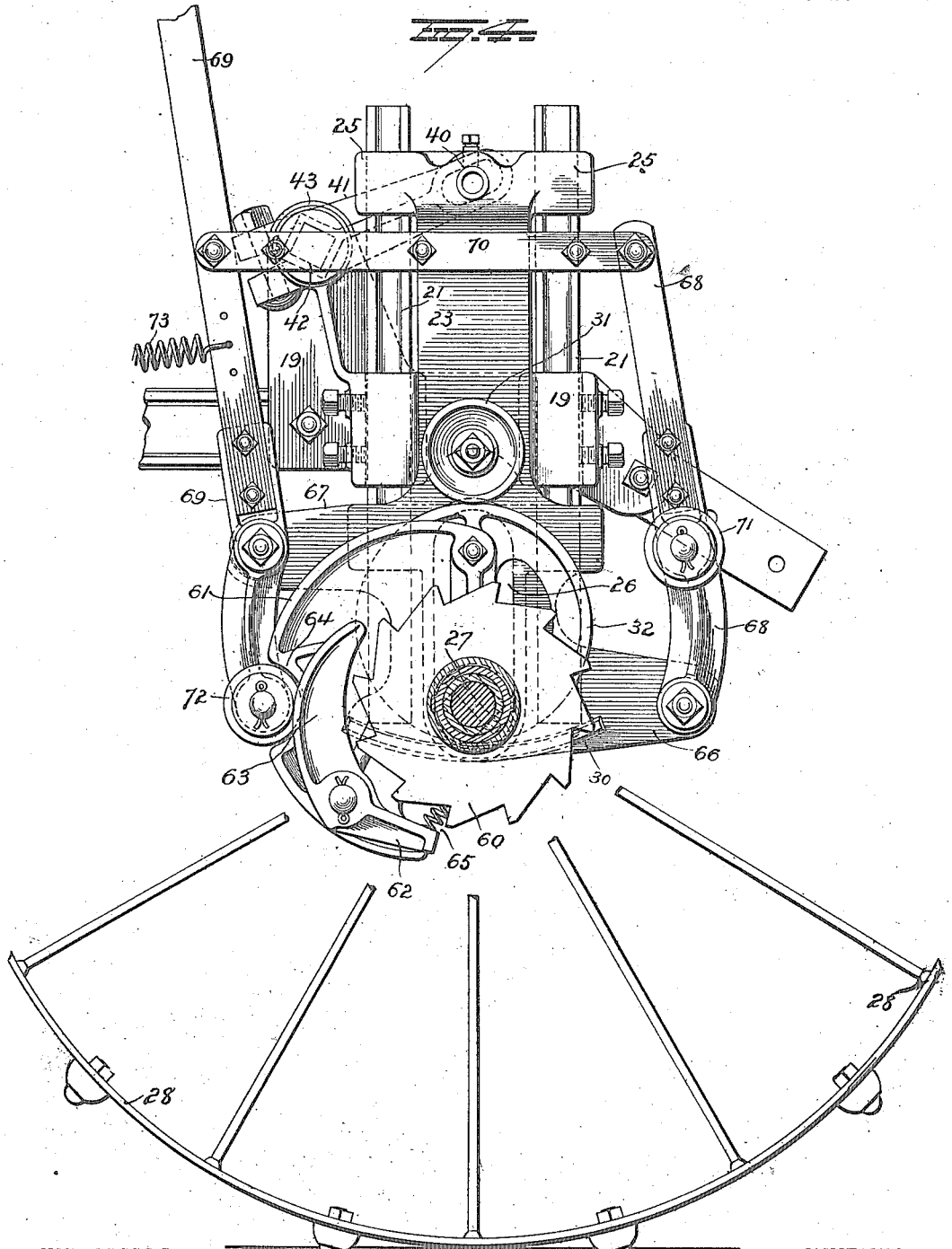

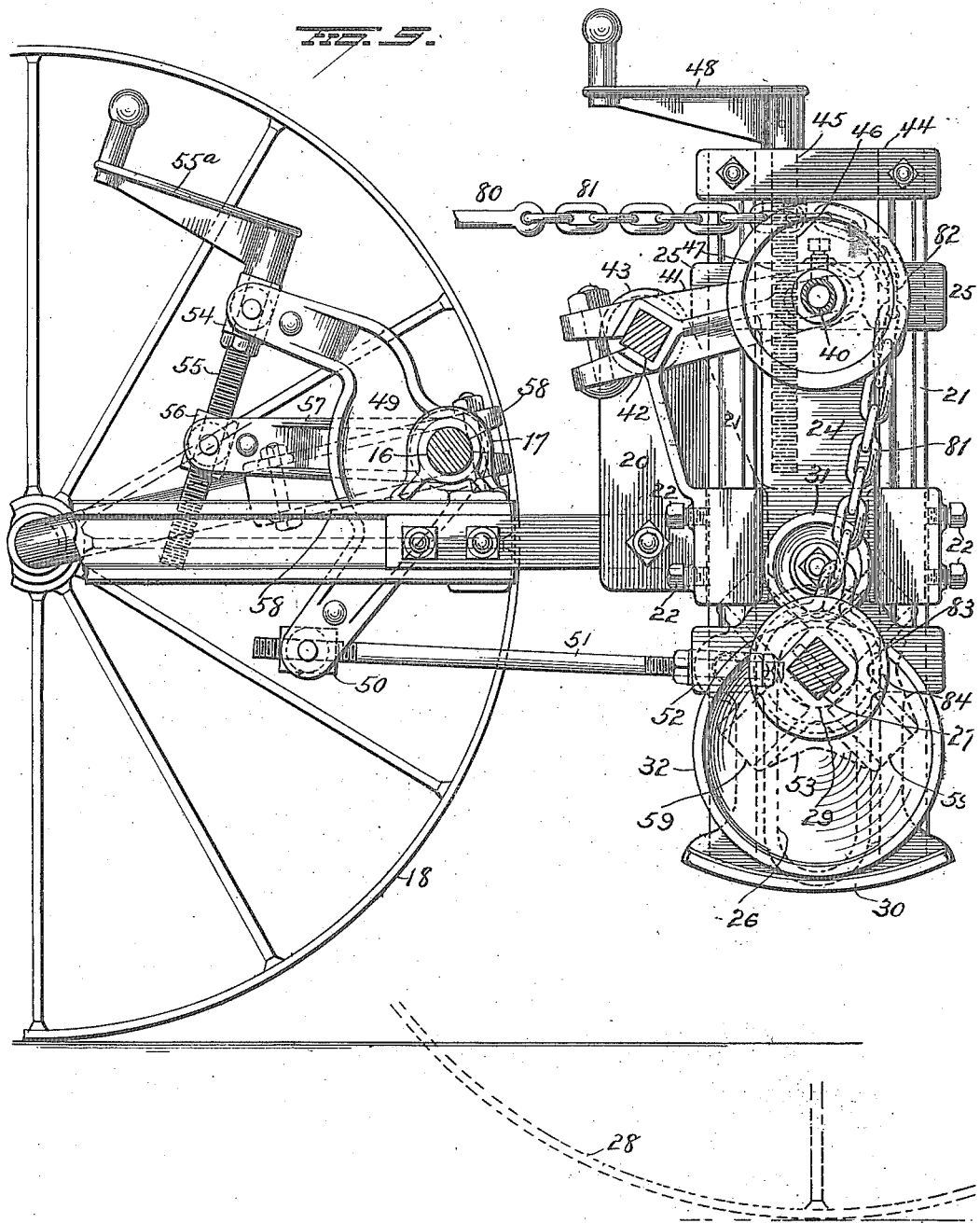

WILLIAM N. SPRINGER, OF SOUTH BEND, INDIANA, ASSIGNOR TO OLIVER CHILLED PLOW WORKS, OF SOUTH BEND, INDIANA.

ENGINE GANG-PLOW.

1,187,789.  Specification of Letters Patent.  Patented June 20, 1916.

Application filed January 7, 1915. Serial No. 1,002.

*To all whom it may concern:*

Be it known that I, WILLIAM N. SPRINGER, a citizen of the United States, and a resident of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows, and more particularly to that type known in the art as engine gang plows,— one object of the invention being to provide simple and efficient means mounted on the plow structure independently of the tractor, for effecting automatically, the raising of the plow beams and bodies as the tractor moves forwardly.

A further object is to provide means whereby the simultaneously raising of both ends of each plow unit may be effected automatically.

A further object is to provide raising means for the plows, which may be operated automatically and also manually, whereby the plows may be raised out of the ground automatically and adjusted for depth of plowing manually, either when the plow units are in raised or working positions.

A further object is to provide automatically operated and manually operable means for raising the plow units, which shall be associated with each other but which may be controlled independently.

A further object is to so construct lifting means for units, that the latter may be raised at both ends simultaneously, either automatically or manually.

A further object is to provide simple means for leveling the plows.

With these and other objects in view, the invention consists in certain novel features of construction and combinations of parts as hereinafter set forth and pointed out in the claims.

In the accompanying drawings; Figure 1 is a side elevation of an engine gang plow embodying my improvements; Fig. 2 is a plan view; Fig. 3 is an enlarged view, partly in section, showing the power lift mechanism when the plow is at work; Fig. 4 is a similar view showing positions of the parts when the plows are in raised position; Fig. 5 is an enlarged sectional view on the line 5—5 of Fig. 2.

My improved plow structure may comprise, one, two or three plow units,—(preferably two or three), but in the drawings I have shown three plow units and will describe the structure as thus constituted.

1, 2, 3 represent the beams of the plow units, and these are bent downwardly at their rear ends to form standards 4 having plow bodies 5 suitably secured thereto. The several plow units are arranged in diagonal formation, as is usual with gang plows. The beam 1 of the forward plow unit is rigidly connected with the beam of the central beam 2 by means of a spreader brace 6 clamped at its respective ends to said beams near their rear ends. The beam 3 of the rear plow unit is rigidly connected with the central beam by means of a spacer brace 7 clamped to said beams near their rear ends. The beam 3 terminates at its forward end, rearwardly of forward ends of the beams 1 and 2 and is connected with the central beam by means of a spacer brace 8, the latter being extended forwardly from the forward end of the beam 3 to form an arm or extension 9 for said beam and terminates in horizontal alinement with the forward ends of the beams 1 and 2. A draft bar 10 is rigidly connected with the forward ends of the beams 1 and 2 and the forward end of the arm or extension 9, by means of couplings 11. Links 12 are adjustably connected with the draft bar, and to these links, other links 13 are connected by break pins 14. Draft devices, such as chains 15, are connected at one end with the links 13, and at their other ends, said chains are adapted for connection with a traction engine or tractor, not shown. A crank axle 16 is disposed transversely over the several beams and mounted in bearings 17 secured thereto, the cranked outer end of said axle being disposed at the left hand side of the structure and suitably mounted in the hub of a ground wheel 18.

Brackets 19—20 are rigidly connected with and project above the forward portions of the beams of the outer plow units (the bracket 20 being secured to the extension 9 of beam 3, when three plow units are employed), and to each of these fixed brackets, two vertical guide bars 21 are rigidly secured by means of set screws 22. Vertically movable slide brackets 23—24 are disposed near the respective fixed brackets 19—20 and are provided with perforated enlargements 25 mounted on the guide bars 21. The vertical slide brackets 23—24 are made with elongated slots 26, through which a forward axle 27 passes, said axle having a journal or spindle bearing in the hub of a forward ground wheel 28 at the right hand side of the structure. The axle 27 may be square in cross section, except at its journal or spindle end, and where said axle passes through the vertical slots of the slide brackets, sleeves 29 may be mounted thereon and disposed in said slots so as to be capable of turning therein.

The slide brackets 23—24 are provided at their lower ends with curved flanges 30 and above the elongated slots 26, rollers 31 are mounted. Between the rollers 31 and the flanges 30, cams 32 are secured to the axle 27, said cams normally engaging the rollers, and thus the forward portion of the plow structure is normally supported on the axle 27, the latter being supported at one side of the structure by the ground wheel 28. The other side of the plow structure is supported by the wheel 18 in which the crank axle 16 is mounted, means being provided for normally locking said crank axle against turning and for adjusting, as hereinafter particularly described. The rear end of the plow structure is supported by a trailing caster wheel 33, the axle bracket 34 of which is mounted in a sleeve 35 connected by pivoted links 36 with a bracket 37 adjustably fixed to the standard of the rear plow unit 3.

Reverting now to the mountings between the plow structure and the forward axle 27, it will be observed that the two slide brackets 23 and 24 are connected by a rigid bar or shaft 40. This bar or shaft is engaged by the slotted ends of arms 41, the latter being rigidly secured to a transverse shaft 42 mounted in bearings 43 on the fixed brackets 19—20 on the outer plow units. With this arrangement of parts, any vertical movement of one of the slide brackets will be imparted to the other, and the necessity for providing separate vertical adjusting means for each slide bracket 23—24 will be obviated. The vertical guide bars 21 for the slide bracket 24, are connected at their upper ends by a cross head 44 having a perforation 45 in which the upper portion of a threaded rod 46 is swiveled, said threaded rod passing through a threaded hole 47 at the upper end of the slide bracket 24, and at the upper end of said threaded rod, a manually operable handle 48 is secured. It is apparent that by operating this handle to turn the threaded rod 46, the guides 21 and the plow structure to which they are secured, will be moved vertically relatively to the slide brackets,— said slide brackets being supported on the front axle 27 and ground wheel 28 as previously explained,—and thus the plow units may be raised or lowered manually to regulate the depth of plowing,— such regulation for depth of plowing being also facilitated by raising the rear ends of the plow units on the trailing caster as a support.

A bracket 49, having a shape approximately that of a bell-crank lever is loosely mounted on the main horizontal portion of the crank axle 16, and in the bifurcated free end of its lower arm, a nut 50 is pivotally mounted. The threaded rear end of a rod or pitman 51 passes through the nut 50, and the forward threaded end of said rod or pitman is adjustably connected with a sleeve 52 pivoted to a head 53,—the latter being rigidly secured to the left hand end of the front axle 27. The upper arm of the bell-crank 49 is bifurcated and carries a pivoted sleeve 54 in which a threaded rod 55 is swiveled. The upper end of this rod is provided with an operating handle 55$^a$ and its threaded portion passes through a nut 56 pivotally mounted in the bifurcated free end of an arm 57, which latter is securely fastened to the arm of the crank axle by means of a clamp 58. It is apparent that by operating the threaded rod 55, the crank axle will be turned so as to move the ground wheel forwardly or backwardly and thus raise or lower the side of the plow structure at which said wheel is located. By means of these devices also, the gang of plows may be accurately leveled.

The head 53 on the axle 27, is provided with a plurality of sockets 59 for the reception of a hand lever (not shown) to facilitate the manual raising of the plow.

The ground wheel 28 is free to rotate on the spindle portion of the front axle 27, and the hub of this wheel carries a ratchet wheel 60. A cam plate 61 is mounted on the square portion of the axle 27 so as to be rotatable therewith and with the cam 32 adjacent to the slide bracket 23. This cam plate carries a pivoted dog 62 having a tail 63 to overlie a recess 64 in the curved edge of said cam plate. A spring 65 tends to press the dog toward the ratchet wheel 60. The slide bracket 23 is provided near its lower portion with laterally projecting arms 66—67. To the arm 66, the lower end of a lever 68 is pivoted, and to the arm 67, a lever 69 is pivoted at a point between its ends, the upper portions of said levers being connected by a rod or bar 70 pivoted at its respective ends thereto. The lever 68 carries a roller 71 to enter the recess 64 in the cam plate 61 and engage the tail of the dog 62 so as to normally prevent engagement of said dog with the ratchet wheel 60. The lever 69 also carries a roller 72 to enter the recess 64 in the cam plate and disengage the dog from the ratchet wheel as presently explained. The levers 68—69 are retained in their normal positions when the plow is at work, with the roller 71 on lever 68 in the recess 64 of cam plate 61, by means of a spring 73 attached at one end to the lever 69 and at the other end to an eyebolt 74 carried by a bracket 75 secured to the beam 1. The lever 69 projects upwardly above the connecting rod 70 and has a rope 76 attached thereto, said rope being extended to the tractor within convenient reach of the operator.

When the operator desires to cause the plows to be raised automatically by power derived from the forward ground wheel 28, he will pull the rope 76 and thus shift the two levers 68 and 69. By this manipulation of said levers, the roller 71 on lever 68 will be moved out of the recess 64 of cam plate 61 and away from the tail of the dog 62, thus permitting the spring 65 to move said dog to engage the ratchet wheel 60. As the plow moves forwardly, motion will be imparted by the rotation of the ground wheel directly to the axle 27, by the engagement of the dog 62 with the ratchet wheel 60, said dog being carried by the cam plate 60 on said axle 27. The cams 32 on the axle now coöperating with the rollers 31 on the slide brackets 23—24, will cause the latter to rise. At this time the slide brackets are locked against movement relatively to the guide bars 21 and fixed brackets 19—20 by the threaded rod 46, and hence when the cams are operated by the power lift mechanism, the plows will be lifted. During the operations above described, the forward axle 27 will be turned by the wheel-operated power mechanism above described and motion will therefore be imparted from the head 53 on said axle to the bell-crank bracket 49 through the medium of the rod or pitman 51. The turning of this bracket will (through the medium of the arm 57 and threaded rod 55) cause the crank axle 16 to be turned and the ground wheel 18 to be shifted to raise the side of the plow structure at which said ground wheel is located. Thus it will be seen that the power lift mechanism will operate to raise the forward ends of the plow units evenly. It is also desirable that the rear ends of the plow units shall be raised when their forward ends are raised, and to accomplish this automatically, the devices now to be described may be employed.

A bell-crank lever 77 is pivotally mounted on the bracket 37 at the rear end of plow beam 3, and one arm of this lever is pivotally connected with the sleeve 35 in which the bracket shaft of the caster wheel 33 is mounted. Another lever 78 is pivoted between its ends to the bracket 37 and a pin-and-slot connection 79 is provided between the lower arm of this lever and the upper arm of the bell-crank 77. One end of a rod 80 is pivotally coupled to the upper arm of the lever 78 and to the forward end of this rod, one end of a chain 81 is connected. The chain passes over a pulley 82 mounted on the rod or shaft 40 and then passes downwardly, its lower end being attached to a ring 83 mounted freely in a grooved wheel 84 secured to the forward axle 27. As the forward ends of the plow units rise relatively to the front axle, the consequent upward movement of the shaft 40 will cause a pull on the rod 80 and this movement will be transmitted through the medium of the lever 78 to the bell-crank 77 and the latter will cause downward pressure on the sleeve 35, thus raising the rear ends of the plow units. After the operator has pulled the rope 76 to throw in the power lift mechanism, he will then release said rope, and the spring 73 will operate to cause the rollers 71—72 on the levers 68—69 to run on the periphery of the cam plate 61 until the plows have been fully raised, when the roller 72 on the lever 69 will enter the recess 64 in the cam plate and disengage the dog 62 from the ratchet wheel 60. The axes of the cams 32 are now in vertical alinement with the axes of the rollers 31 and the plows will be retained in their raised positions. Another pull on the rope 76 will now cause the dog 62 to again engage the ratchet wheel 60 and the continued forward travel of the plow will cause the cams to complete their rotation to lower the plow units and when they shall have assumed their working positions, the roller 71 on lever 68 will enter the recess 64 in cam plate 61 and release the dog 62 from the ratchet wheel. During the turning of the cams 32 to lower the plow, said cams will coöperate with the flanges 30 at the lower ends of the side brackets, and the tendency will be to raise the wheels when the plow body engages the ground, thus utilizing the weight of the wheels and axles to force the plow body into the ground quickly.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination of an implement frame, forward axles, a rear axle, wheels on said axles, means connecting said axles for simultaneous operation to raise or lower the frame, wheel operated power mechanism for imparting movement directly to one of said axles, and manually operable controlling means for said wheel operated power mechanism.

2. The combination of an implement frame, forward axles, a rear axle, wheels on said axles, means connecting said axles for simultaneous operation to raise or lower the frame, wheel operated power mechanism for imparting rotation directly to one of said axles, and manually operable controlling means for said wheel operated power mechanism.

3. The combination with an implement frame, two axles therefor, and wheels on said axles, of means connecting said axles for simultaneous operation to raise or lower the frame, wheel operated power mechanism for imparting rotation directly to one of said axles, and manually operable controlling means for said wheel operated power mechanism.

4. The combination with an implement frame, axles and ground wheels, of connections between said axles for causing simultaneous movement of the same to raise or lower said frame, wheel operated power lift mechanism for imparting movement directly to one of said axles, manually operable controlling means for said wheel operated power lift mechanism, and manually operable adjusting devices connected with the respective axles and operable independently of each other.

5. The combination with an implement frame, ground wheels, a forward axle mounted in one of said ground wheels, and a crank axle mounted in the other ground wheel, a head secured to the forward axle, a lever bracket mounted on the crank axle, means for securing said lever bracket to the axle, a pitman connecting said lever bracket with the head on the forward axle, wheel operated power lift mechanism for imparting movement directly to said forward axle, and manually operable controlling means for said wheel operated power lift mechanism.

6. The combination with a plow, axles and wheels in which said axles are mounted, of brackets, means for securing said brackets to the plow, said brackets having slots for the passage of one of said axles, cams on said axle, rollers on the brackets to be engaged by said cams, a ratchet wheel secured to the adjacent ground wheel, a dog connected with said axle and adapted to engage said ratchet wheel, and means for controlling the operation of said dog.

7. The combination with a plow and ground wheels at respective sides of the plow, of brackets having elongated slots, means for securing said brackets to the plow, an axle passing through said slots and mounted in one of said ground wheels, cams on said axle, rollers on the brackets to be engaged by said cams, a ratchet wheel secured to the adjacent ground wheel, a plate secured to the axle, a spring-pressed dog carried by said plate, and manually operable means for controlling the operation of said dog.

8. The combination with a plow, and ground wheels at respective sides of the plow, of brackets having elongated slots, means for securing said brackets to the plow, an axle passing through said slots and mounted in one of said ground wheels, cams on said axle, rollers on the brackets to be engaged by said cams, a ratchet wheel secured to the adjacent ground wheel, a cam plate secured to the axle and having a peripheral recess, a spring-pressed dog on said cam plate for engaging the ratchet wheel, said dog having a tail overlying said peripheral recess, pivoted levers, rollers on said levers to enter said recess and engage the tail of the dog, a spring for holding said levers in and moving them to a normal position, and means for manually moving said levers in the other direction.

9. The combination with a plow, and ground wheels at respective sides thereof, of brackets fixed to said plow, pairs of guide bars secured to said brackets, slide brackets on said guide bars and having elongated slots, an axle passing through said slots and mounted in one of said ground wheels, power lift mechanism between said slide brackets and said axle, means for operatively connecting said mechanism with the last-mentioned ground wheel, a bar connecting said slide brackets, a shaft mounted on the fixed bracket, arms connecting said shaft with said connecting bar, a cross-head connecting the guide bars of one pair, and a manually operable screw rod swiveled on said cross head and operatively connected with the adjacent slide bracket.

10. The combination with a plow, axles and wheels, of a bracket secured to the plow, a cam, means operable by one of said wheels to rotate said cam, means on said bracket with which the cam coöperates to raise the plow, and means on said bracket in position to be engaged by the cam to lower the plow onto the ground and simultaneously raise the wheels and axles, whereby the weight of said wheels and axle is utilized to force the plow into the ground.

11. The combination with a plow, axles and wheels, of a bracket secured to the plow and having a flange at its lower end, a roller on the bracket above said flange, a cam disposed between said roller and flange and coöperable with each, and means operable from one of the wheels to operate said cam, whereby the plow will be raised or lowered and forced into the ground.

In testimony whereof, I have signed this specification in the presence of two subscribing witnesses.

WILLIAM N. SPRINGER.

Witnesses:
EDWIN NICAR,
KATE E. BUCKLEY.